(12) United States Patent
Faroha

(10) Patent No.: US 11,299,988 B2
(45) Date of Patent: Apr. 12, 2022

(54) ROTARY TURBINE COMBUSTION ENGINE

(71) Applicant: Amjad Faroha, Wheaton, IL (US)

(72) Inventor: Amjad Faroha, Wheaton, IL (US)

( * ) Notice: Subject to any disclaimer, the term of this patent is extended or adjusted under 35 U.S.C. 154(b) by 0 days.

(21) Appl. No.: 16/895,489

(22) Filed: Jun. 8, 2020

(65) Prior Publication Data

US 2021/0381378 A1   Dec. 9, 2021

(51) Int. Cl.

| | |
|---|---|
| *F02B 53/04* | (2006.01) |
| *F02B 53/06* | (2006.01) |
| *F02B 53/10* | (2006.01) |
| *F02B 55/14* | (2006.01) |
| *F02B 55/16* | (2006.01) |
| *F02C 5/04* | (2006.01) |
| *F01C 20/02* | (2006.01) |

(52) U.S. Cl.
CPC .............. *F01C 20/02* (2013.01); *F02B 53/04* (2013.01); *F02B 53/06* (2013.01); *F02B 53/10* (2013.01); *F02B 55/14* (2013.01); *F02B 55/16* (2013.01); *F02C 5/04* (2013.01)

(58) Field of Classification Search
CPC .......... F02B 53/04; F02B 53/06; F02B 53/10; F02B 55/14; F02B 55/16; F02C 5/04; F01C 20/02

See application file for complete search history.

(56) References Cited

U.S. PATENT DOCUMENTS

| | | | | |
|---|---|---|---|---|
| 1,287,049 A | * | 12/1918 | Kramer | ..................... F02C 5/04 60/39.34 |
| 1,934,237 A | | 11/1933 | Russell | |
| 2,486,990 A | | 11/1949 | Sharpe | |
| 3,541,787 A | | 11/1970 | Romoli | |
| 3,690,095 A | | 9/1972 | Ignelzi et al. | |
| 4,229,938 A | | 9/1980 | Gallagher | |
| 4,590,761 A | * | 5/1986 | Zettner | .................. F01C 11/008 60/39.34 |
| 5,282,356 A | * | 2/1994 | Abell | ...................... F02C 3/165 416/21 |
| 5,408,824 A | * | 4/1995 | Schlote | .................... F02C 3/165 60/39.35 |
| 5,660,038 A | | 8/1997 | Stone | |
| 6,289,867 B1 | * | 9/2001 | Free | ........................ F01C 1/063 123/245 |
| 6,672,048 B2 | | 1/2004 | Johnstone | |
| 6,907,723 B1 | * | 6/2005 | Haskins | .................... F01D 1/32 60/39.34 |

(Continued)

FOREIGN PATENT DOCUMENTS

JP   57119130 A   *   7/1982   .............. F02B 53/02

*Primary Examiner* — Audrey B. Walter

(74) *Attorney, Agent, or Firm* — Erickson Law Group, PC

(57) ABSTRACT

A rotary engine includes a shroud surrounding a rotor. The rotor carries a combustion chamber spaced from an axis of rotation of the rotor. A pressure activated valve is located between the combustion chamber and obliquely arranged exhaust nozzles. An ECU controls the combustion cycle of the engine based on a signal from a pressure sensor in the combustion chamber. The electronic control responds to the pressure signal from the pressure sensor to open a fuel control valve, to fire a spark plug and cause combustion of the fuel within the combustion chamber, and to thereafter open an air control valve to purge the combustion chamber of exhaust gasses.

7 Claims, 5 Drawing Sheets

(56) References Cited

U.S. PATENT DOCUMENTS

| | | |
|---|---|---|
| 9,109,535 B2 | 8/2015 | Khong |
| 9,291,095 B2 * | 3/2016 | Koch ................... F01C 21/08 |
| 10,273,879 B2 | 4/2019 | Orellana Hurtado |
| 10,280,838 B2 | 5/2019 | Lee |

* cited by examiner

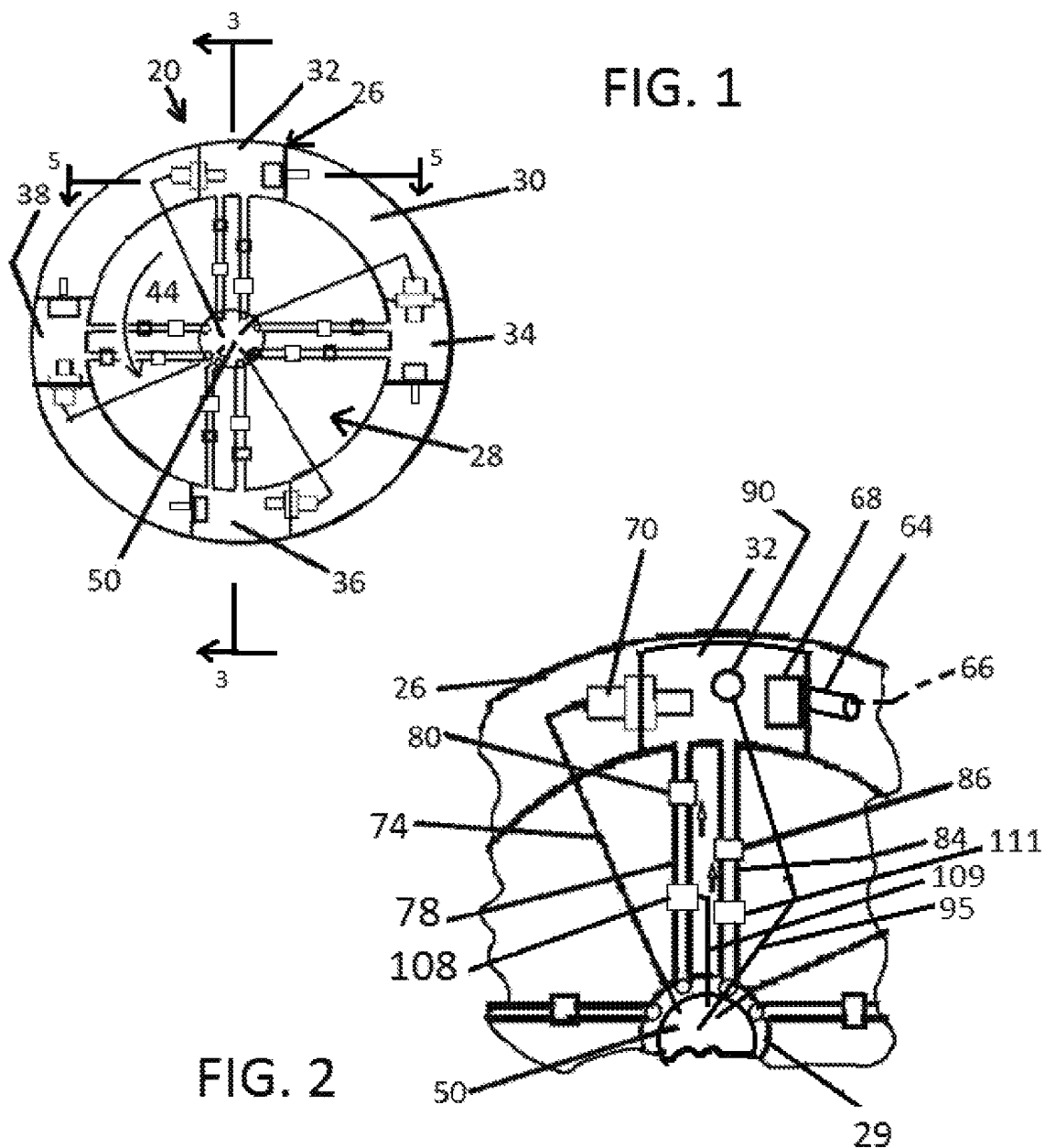

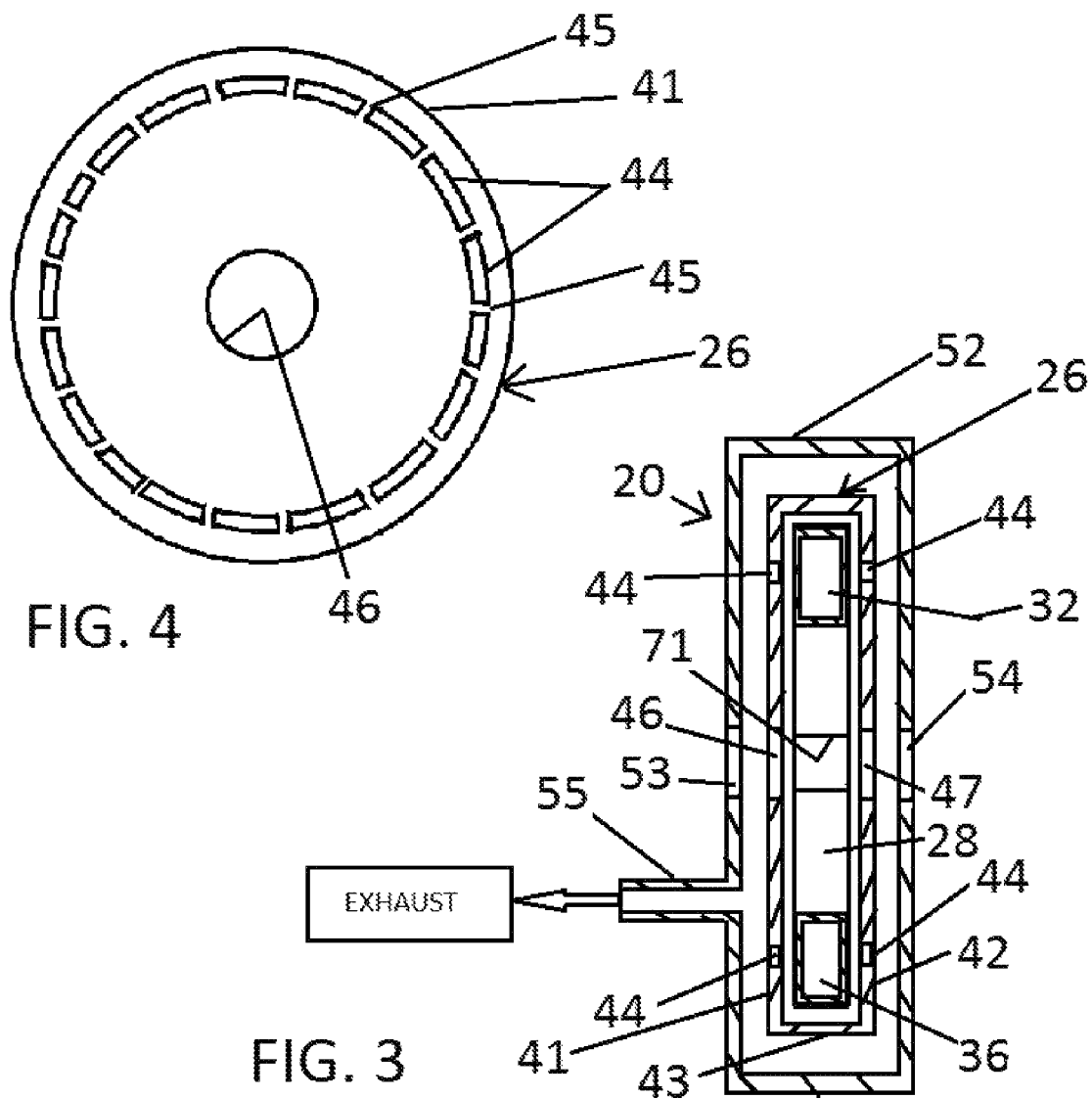

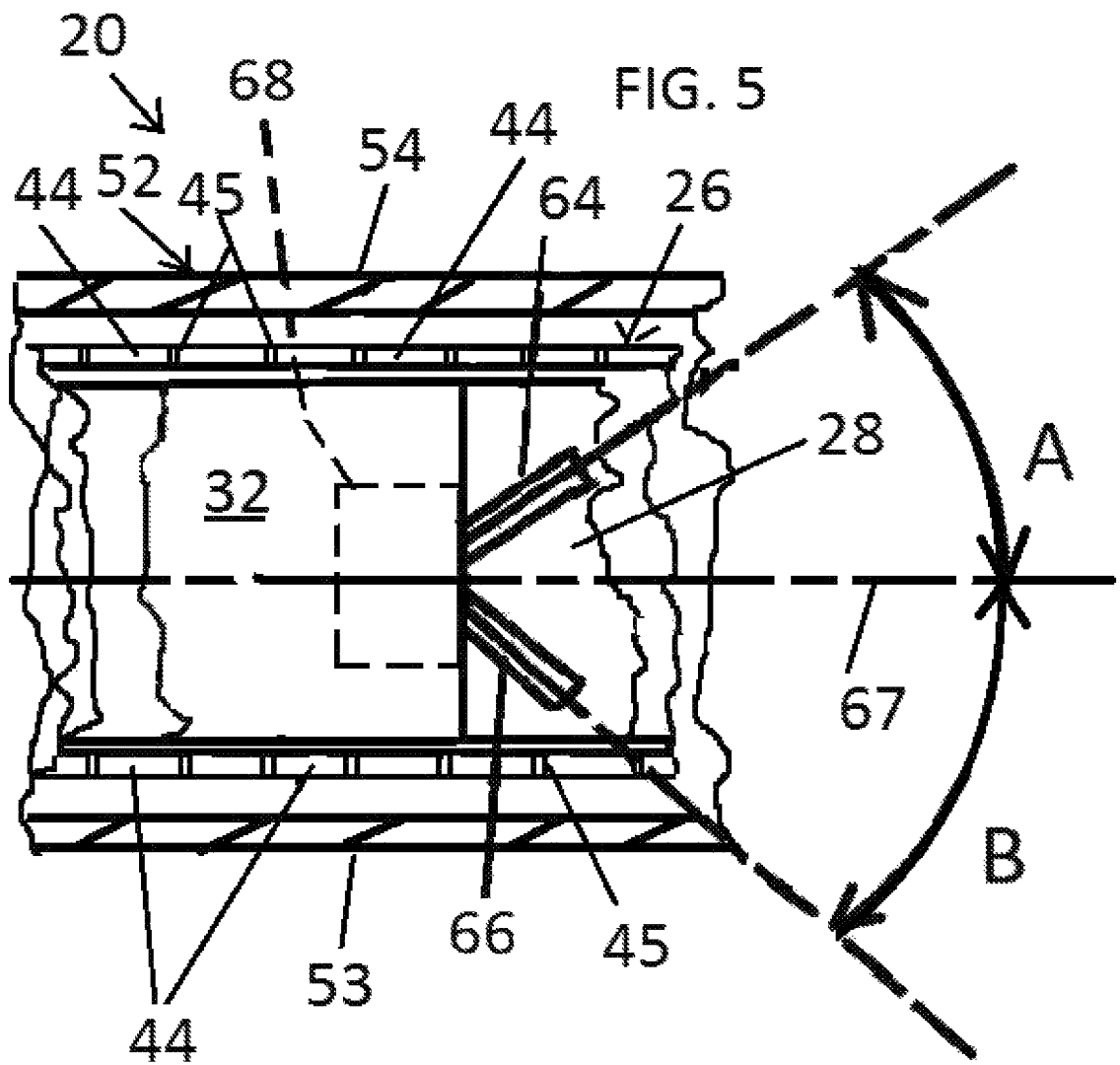

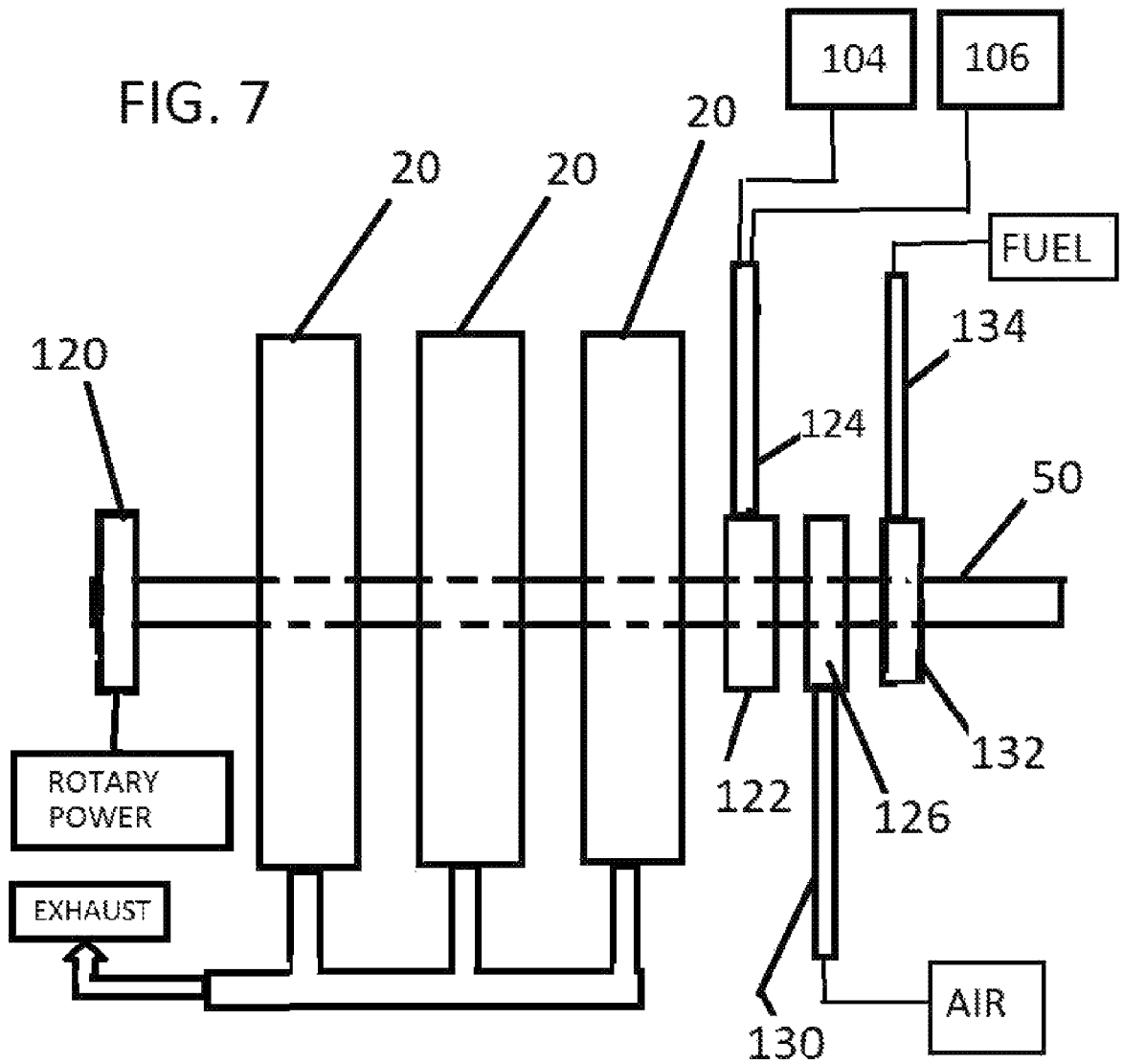

ROTARY TURBINE COMBUSTION ENGINE

BACKGROUND

Numerous designs of rotary piston engines have been attempted. The rotary piston engine known as the Wankel engine has not replaced the reciprocating engine. The basic idea of the rotary engine is to convert the expansion forces of combustion gases directly into a rotary movement. Turbine engines translate expansion forced into rotary movement. However, the high rotational speed of a turbine limits its application.

U.S. Pat. No. 4,590,761 describes an internal combustion engine comprising a circular inner rotor, and a concentric outer shroud, the rotor being rotatable relative to the shroud. The rotor has equidistantly spaced expansion chambers and combustion chambers around its circumference. Combustion gas from each combustion chamber is restricted by a nozzle, to emerge into the associated expansion chamber, as a gas jet.

The shroud is provided around its circumference, facing the rotor, equidistantly spaced reciprocating reaction members each movable into and out of the expansion chambers, such that when projecting into the expansion chambers, the reaction members serve as barriers to the gas jets and mutually opposite forces act between the rotor and shroud to effect rotation of the rotor.

U.S. Pat. No. 4,590,761 is herein incorporated by reference to the extent it is not contrary to the present disclosure.

U.S. Pat. Nos. 1,287,049; 1,934,237; 2,486,990; 4,229,938; 5,282,356; 5,408,824; 6,907,723 describe other attempts at rotary engines, all of which are herein incorporated by reference to the extent they are not contrary to the present disclosure.

The present inventor has recognized the desirability to provide an improved rotary combustion engine that has increased performance, reduced emissions and an increased reliability due to a decreased number of parts.

SUMMARY

An exemplary embodiment of the invention provides a rotary engine that includes a shroud surrounding a rotor. The rotor carries at least one combustion chamber spaced from an axis of rotation of the rotor. A drive shaft is engaged to the rotor for mutual rotation. An electronic control, such as an engine control unit (ECU) controls the combustion cycle of the engine based on a signal from a pressure sensor in the combustion chamber.

A conduit for delivering fuel into the combustion chamber includes a fuel control valve in signal-communication with the electronic control. The pressure sensor is configured to monitor combustion chamber pressure and configured to send a corresponding pressure signal to the electronic control. An electric ignition system providing an igniter in the combustion chamber, and is in signal-communication with the electronic control. The ignition system can be in the form of a coil and a spark plug.

A least one exhaust outlet is directed from the combustion chamber at least partly tangential to the axis of rotation, such that the mass flow of exhaust gas through the exhaust outlet drives the rotor in rotation.

The electronic control responds to the pressure signal from the pressure sensor to cause the fuel control valve to open and thereafter the ignition system to fire the igniter and cause combustion of the fuel within the combustion chamber.

The rotary engine can include a pressure activated valve, such as a relief valve, located between the combustion chamber and the exhaust outlet. The pressure activated valve can automatically open at a set pressure to expel exhaust gas though the outlet, and close thereafter automatically when pressure falls to the set pressure. The pressure activated valve set pressure controls the pressure of the fuel before ignition and determines when the exhaust gases have been expelled.

The rotary engine can comprise an air conduit for delivering pressurized air into the combustion chamber. The air conduit includes an air control valve in signal-communication with the electronic control, wherein after combustion, in response to a pressure signal from the pressure sensor, the electronic control opens the air control valve to deliver pressurized air into the combustion chamber at a pressure higher than the pressure activated valve set pressure to purge exhaust gases from the combustion chamber.

The shroud can include opposite walls, and each of the opposite walls can include exhaust openings arranged spaced-apart in a circle and in radial alignment with the at least one exhaust outlet. The at least one exhaust outlet can comprise two exhaust nozzles arranged at obliques angles to a center plane of the rotor, the center plane perpendicular to the axis of rotation. Each exhaust nozzle can be directed toward a respective one of the opposite walls of the shroud. The rotary engine can include an exhaust plenum surrounding the shroud, the exhaust plenum having a plenum exhaust outlet.

A power plant can be configured with multiple rotary engines along a single output shaft. The rotary engines can be controlled in parallel, or each independently.

A exemplary method of controlling a rotary engine, includes the steps of:

providing a shroud surrounding a rotor, the rotor carrying at least one combustion chamber spaced from an axis of rotation of the rotor, and an exhaust outlet directed from the combustion chamber at least partly tangential to the axis of rotation;

monitoring pressure within the combustion chamber;

delivering pressurized fuel into the combustion chamber;

when the pressure in the combustion chamber reaches a first pre-selected pressure value, igniting the fuel in the combustion chamber and directing exhaust gas out of the exhaust outlet causing the rotor to rotate;

when the exhaust gas within the combustion chamber reaches a second pre-selected pressure value, delivering pressurized air into the exhaust chamber to purge exhaust gas from the combustion chamber.

The first pre-selected pressure value and the second pre-selected pressure value can be approximately equal.

The step of delivering pressurized air can be further defined in that the exhaust gas is purged out of the exhaust outlet.

The first and second pre-selected pressure values can be set by a pressure activated valve in the exhaust outlet.

Numerous other advantages and features of the present invention will be become readily apparent from the following detailed description of the invention and the embodiments thereof, and from the accompanying drawings.

BRIEF DESCRIPTION OF THE DRAWINGS

FIG. 1 is a schematic elevation view of an exemplary embodiment of a rotary turbine engine according to the invention;

FIG. 2 is an enlarged fragmentary schematic view of a portion of FIG. 1;

FIG. 3 is a schematic sectional view taken generally through plane 3-3 of FIG. 1;

FIG. 4 is an elevational view of a portion of the rotary turbine engine shown in FIG. 3;

FIG. 5 is a schematic sectional view taken generally through plane 5-5 of FIG. 1;

FIG. 7 is a schematic plan view of multiple rotary turbine engines mounted on a common drive shaft.

DETAILED DESCRIPTION

Figure 6:
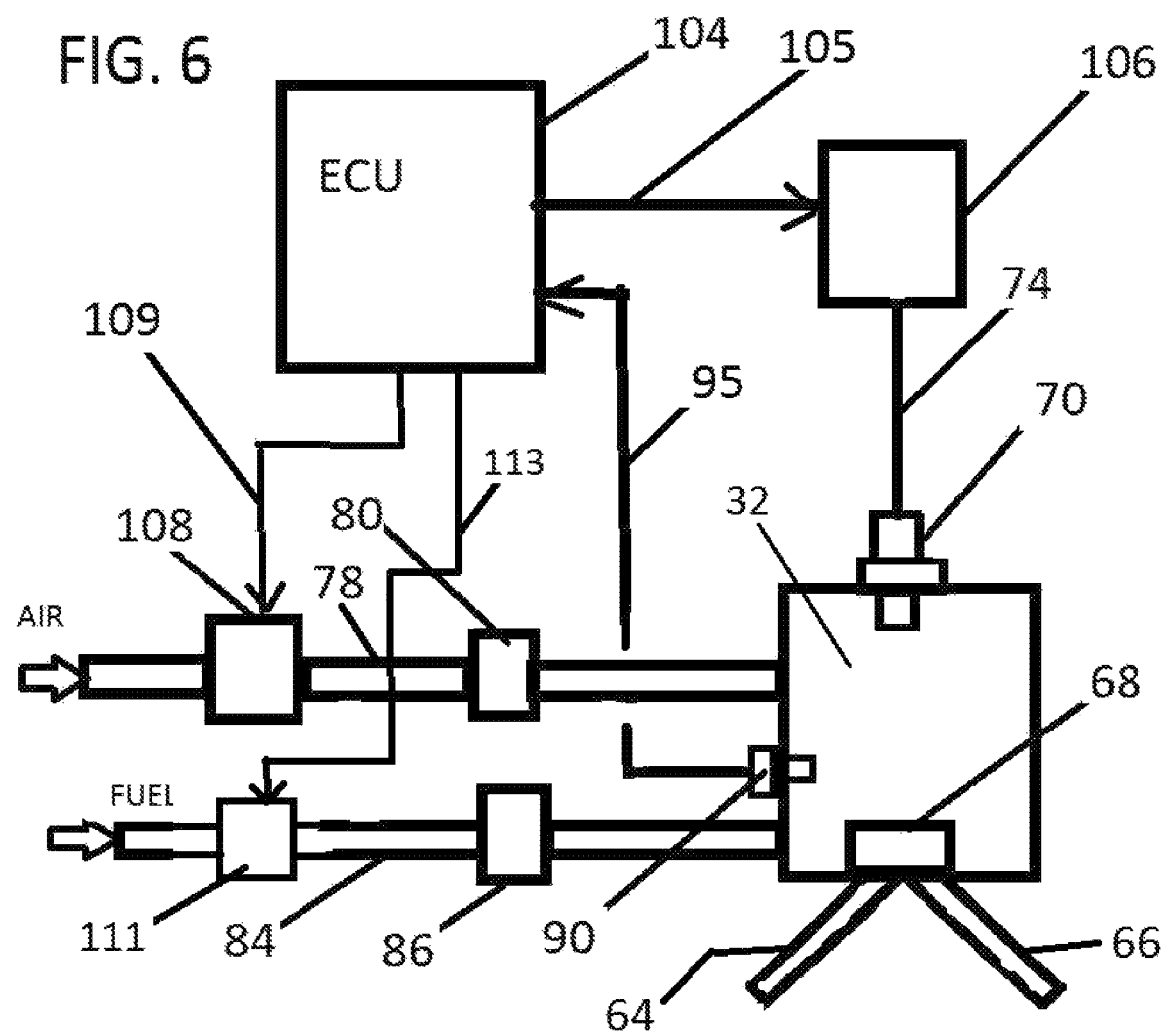
FIG. 6 is a schematic diagram of an engine control system of the embodiment of FIG. 1.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a rotary engine 20 according to an exemplary embodiment of the present invention. The engine includes a shroud 26 surrounding a rotor 28. The rotor 28 includes, either formed therewith or attached thereto, four combustion chambers 32, 34, 36, 38. Although one, two, three or any number of chambers are also encompassed by the invention. The rotor 28 is configured to rotate in the rotary direction 44 with respect to the stationary shroud 26. Rotation of the rotor 28 rotates a driveshaft 50 which is splined to a center hub 29 (FIG. 2) of the rotor 28.

FIG. 2 illustrates an enlarged portion of the engine 20 of FIG. 1. The details of one combustion chamber 32 are shown and described with the understanding that the remaining combustion chambers 34, 36 and 38 are identical to the combustion chamber 32 and operate in the same manner.

Exhaust nozzles 64 and 66 (behind 64) channel exhaust gases from the combustion chamber 32 that pass through a pressure activated valve 68, such as a relief valve. The pressure activated valve 68 is selected to open at a desired combustion pressure to expel the exhaust gas. A spark plug 70 is threaded into a wall of the combustion chamber 32 to deliver a spark therein. The spark plug 70 is powered via a high-voltage conductor 74. A pressurized air line 78 connects a source of pressurized air to the combustion chamber 32. A control valve 108 and a check valve 80 are located in the air line 78. Flow of pressurized air must pass through the control valve 108 and the check valve 80 to be delivered into the combustion chamber 32. A fuel line 84 delivers pressurized fuel to the combustion chamber 32. A control valve 111 and a check valve 86 are located in the fuel line 84. Pressurized fuel must pass through the control valve 111 and through the check valve 86 to be delivered into the combustion chamber 32. The fuel can be a pre-mixed, pressurized, air/gasoline mixture, or any combustible fuel suitable to the engine.

FIG. 3 illustrates the engine 20 includes the chambers 32, 36 are fastened to the rotor 28. The shaft 50 and other parts are not shown in FIG. 3 for simplicity of depiction. The rotor 28 is surrounded by the shroud 26 having a front wall 41 and a back wall 42 and a surrounding rim 43. The front wall 41 and the back wall 42 are substantially identical. The front wall 41 is illustrated in FIG. 4. The front and back walls have openings 44 separated by solid areas or pins 45. The openings 44 are arranged in a circle and substantially radially aligned with the exhaust nozzles 64, 66 of the chambers 32, 34, 36, 38. The front and back walls have central openings 46, 47 to allow passing through of the shaft 50. The central openings 46, 47 can have a seal between the front wall 41 and the back wall 42 and the rotating shaft 50.

The rotor 28 includes a splined or keyed opening 71 through the hub 29 for receiving the corresponding splines or key of the shaft 50 to ensure that the rotor and the shaft rotate together. Rotary power is transferred from the rotor 28 to the shaft 50.

An exhaust plenum 52 surrounds the shroud 26. The plenum includes a front central opening 53 and a back central opening 54 to allow passing through of the shaft 50. The plenum 52 includes one or more exhaust nozzles 55 to channel the exhaust gas from the exhaust nozzles 64, 66 of the chambers 32, 34, 36, 38 that passes through the openings 44 of the shroud.

FIG. 5 shows the arrangement of the exhaust nozzles 64, 66. The exhaust nozzles are arranged at opposite oblique angles from a center plane 67 of the engine 20. According to the exemplary embodiment of the invention, the exhaust nozzle 64 is arranged at an acute angle A from the center plane, and the exhaust nozzle 66 is arranged at an acute angle B from the center plane. The angles A and B can be the same or different.

FIG. 6 illustrates a control system for the engine 20. A controller or ECU 104 sends a timed ignition signal 105 to a high-voltage coil 106 which sends a high current to the spark plug 70 via the conductor 74 to initiate a spark. A pressure sensor 90 constantly monitors the pressure within the combustion chambers 32, 34, 36, 38 and sends an electrical pressure signal 95 to the ECU 104. The check valves 80, 86 prevent combustion pressure backflows from entering the supply of air or fuel. The control valve 108 receives an electrical signal 109 from the ECU 104 to open to send a short duration high-pressure flow of air into the combustion chamber to remove exhaust gases from the chamber 32. The control valve 111 receives a signal 113 from the ECU to admit pressurized fuel into a select one of the combustion chambers 32, 34, 36, 38.

The pressure signal 95 sets the timing for ignition within each chamber. The pressure activated valve 68 in each chamber is set at a set pressure below the pressure of the air and fuel supplied through the valves 108, 111.

The combustion cycle of each chamber is identical, so only the cycle of chamber 32 is hereinafter described. Picking an arbitrary starting point to describe the combustion cycle, the chamber 32 is initially filled with pressurized air from the valve 108 and at pressure activated valve set pressure. The chamber pressure is monitored by the sensor 90. A signal 113 then opens the fuel control valve 111 to fill the chamber 32 to fuel pressure. Some fuel air mixture will pass through the pressure activated valve 68 during filling given the fuel pressure being greater than the pressure activated valve pressure. The pressure sensor 90 sends the chamber pressure signal to the ECU 104. When the chamber pressure exceeds a preselected value, the ECU 104 sends an ignition signal 105 to coil 106 and the spark plug 70 fires and combustion occurs. Once combustion occurs within the chamber 32, pressure exceeds the pressure activated valve set pressure which allows combustion gas to rapidly flow through the exhaust nozzles 64, 66. The tangential component of the exhaust gas flow, parallel to the central plane 67, drives all the chambers 32, 34, 36, 38, and the rotor 28, in the rotary direction 44.

Once the pressure reduces below the pressure activated valve pressure setting and the pressure activated valve closes, the ECU 104 send the signal 109 to the air control valve 108 to open to issue a short duration air blast into the chamber 32. The air blast is at a greater pressure than the pressure activated valve setting in order to flush residual exhaust gasses out of the chamber 32. Once flushing of the residual exhaust gases is complete, the air control valve is closed and the chamber pressure returns to the pressure activated valve set pressure and the pressure activated valve closes. The chamber 32 is now filled with pressurized air. The ECU sends a signal to the control valve 111 to inject fuel into the chamber 32 and the cycle continues.

FIG. 7 illustrates another advantage of the device 20. Particularly that a select number of engines 20 can be mounted along a splined output shaft 50. In this way, a user can easily design a power plant having multiple engines 20 depending on the power requirement for the power plant. The shaft 50 is driven into rotation by the rotors 28 and outputs rotary power to a pulley 120 or sprocket, transmission or the like, to provide useful rotary power.

The electrical conductors 74, 95, 109, the air line 78 and the fuel line 84 are each embedded in, or carried by, the rotor 28 and/or the shaft 50 and rotate or revolve with the rotation of the shaft 50. The electrical conductors 74, 95, 109 are provided with a multi-channel stationary-to-rotary distributor 122. It is possible that the electrical conductor 74, being high voltage and current would have its own separate stationary-to-rotary distributor. The air line 78 is provided with a stationary-to-rotary distributor 126. The fuel line 84 is provided with a stationary-to-rotary distributor 132.

The stationary-to-rotary distributor 122 receives power and electrical signals to/from the ECU 104 and the coil 106 through a multi-channel cable 124.

The stationary-to-rotary distributor 126 receives pressurized air through a pressure air line 130.

The stationary-to-rotary distributor 132 receives pressurized fuel, such as an air/gasoline mixture, through a pressure fuel line 134.

Thus, the stationary ECU (stationary with respect to the shroud, i.e., non-rotating) can be in signal communication with rotating or revolving conductors 95, 109 and the stationary coil 106 (stationary with respect to the shroud, i.e., non-rotating) can be in electrical communication with the rotating or revolving conductor 74. Likewise, the stationary source of pressurized air (stationary with respect to the shroud, i.e., non-rotating) can be in flow communication with rotating or revolving air line 78 and the stationary source of pressurized fuel can be in flow communication with the rotating or revolving fuel line 84.

The multiple devices 20, 20, 20 (for example three) each have combustion chambers 32, 34, 36, 38 and for simplicity the chambers 32, 32, 32 are operated and controlled in parallel, the chambers 34, 34, 34 are operated and controlled in parallel, the chambers 36, 36, 36 are operated and controlled in parallel, and the chambers 38, 38, 38 are operated and controlled in parallel. It is also possible that the chambers 32, 32, 32 are operated and controlled independently, the chambers 34, 34, 34 are operated and controlled independently, the chambers 36, 36, 36 are operated and controlled independently, and the chambers 38, 38, 38 are operated and controlled independently, for a more advanced control scheme.

From the foregoing, it will be observed that numerous variations and modifications may be incorporated without departing from the spirit and scope of the invention. It is to be understood that no limitation with respect to the specific apparatus illustrated herein is intended or should be inferred.

The invention claimed is:

1. A rotary engine, comprising:
a first shroud surrounding a first rotor;
the first rotor having a first axis of rotation and carrying a first combustion chamber spaced from the first axis of rotation of the first rotor, the first combustion chamber moving along a first circular path as the first rotor rotates about the first axis of rotation;
a drive shaft engaged to the first rotor for mutual rotation;
an electronic control;
a first conduit for delivering fuel into the first combustion chamber, the first conduit including a first fuel control valve in signal-communication with the electronic control;
a first pressure sensor arranged in the first combustion chamber and configured to monitor pressure in the first combustion chamber and configured to send a corresponding pressure signal to the electronic control;
a first electric ignition system providing a first igniter in the first combustion chamber, and in signal-communication with the electronic control;
a first exhaust outlet directed from the first combustion chamber in a direction having a tangential direction component that is tangential to the circular path that is greater than zero;
the electronic control configured to respond to the pressure signal from the first pressure sensor to cause the first fuel control valve to open and thereafter the first ignition system to fire the first igniter and cause combustion of the fuel within the first combustion chamber.

2. The rotary engine according to claim 1, comprising a first pressure activated valve located between the combustion chamber and the first exhaust outlet, the first pressure activated valve configured to open at a first set pressure to expel exhaust gas though the first exhaust outlet.

3. The rotary engine according to claim 2, further comprising a first air conduit for delivering pressurized air into the first combustion chamber, the first air conduit including a first air control valve in signal-communication with the electronic control, wherein after combustion, in response to a pressure signal from the first pressure sensor, the electronic control is configured to open the first air control valve to deliver pressurized air into the first combustion chamber at a pressure higher than the set pressure of the first pressure activated valve.

4. The rotary engine according to claim 3, wherein the first shroud includes opposite walls, and each of the opposite walls includes exhaust openings arranged spaced-apart in a circle and in radial alignment with the first exhaust outlet.

5. The rotary engine according to claim 4, wherein the first exhaust outlet comprises two exhaust nozzles arranged at obliques angles to a center plane of the rotor, the center plane perpendicular to the axis of rotation, each nozzle directed toward a respective one of the opposite walls of the shroud.

6. The rotary engine according to claim 5, comprising a first exhaust plenum surrounding the first shroud, the first exhaust plenum having a first plenum exhaust outlet.

7. The rotary engine according to claim 6, further comprising:
a second shroud surrounding a second rotor;
the second rotor having a second axis of rotation and carrying a second combustion chamber spaced from the second axis of rotation of the second rotor, the second combustion chamber moving along a second circular path as the second rotor rotates about the second axis of rotation;

the drive shaft engaged to the second rotor for mutual rotation;
a second conduit for delivering fuel into the second combustion chamber, the second conduit including a second fuel control valve in signal-communication with the electronic control;
a second pressure sensor arranged in the second combustion chamber and configured to monitor combustion chamber pressure in the second combustion chamber and configured to send a corresponding pressure signal to the electronic control;
a second electric ignition system providing a second igniter in the second combustion chamber, and in signal-communication with the electronic control;
the second combustion chamber having a second exhaust outlet directed from the second combustion chamber having a second tangential direction component that is tangential to the second circular path that is greater than zero;
the electronic control configured to respond to the pressure signal from the second pressure sensor to cause the second fuel control valve to open and thereafter the second ignition system to fire the second igniter and cause combustion of the fuel within the second combustion chamber.

* * * * *